March 5, 1935.   R. L. HUBER   1,993,448
SYSTEM IN STEREOSCOPIC PHOTOGRAPHY
Filed March 29, 1930
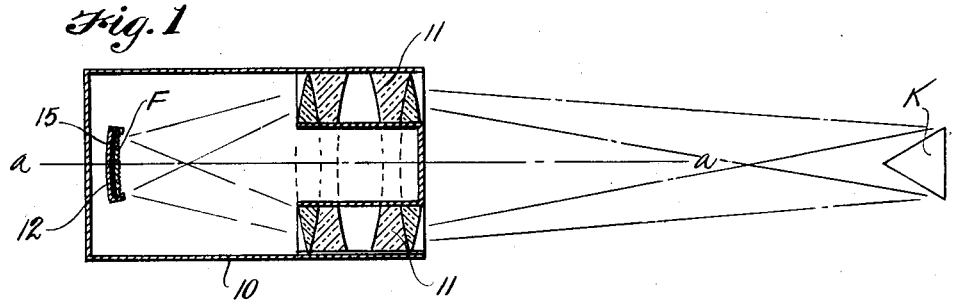
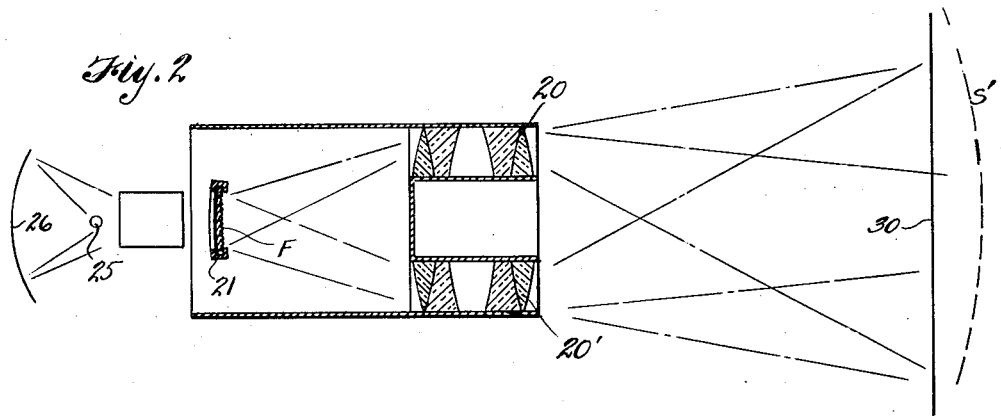
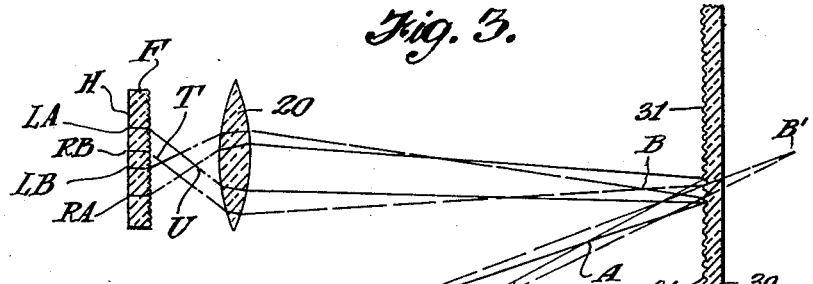
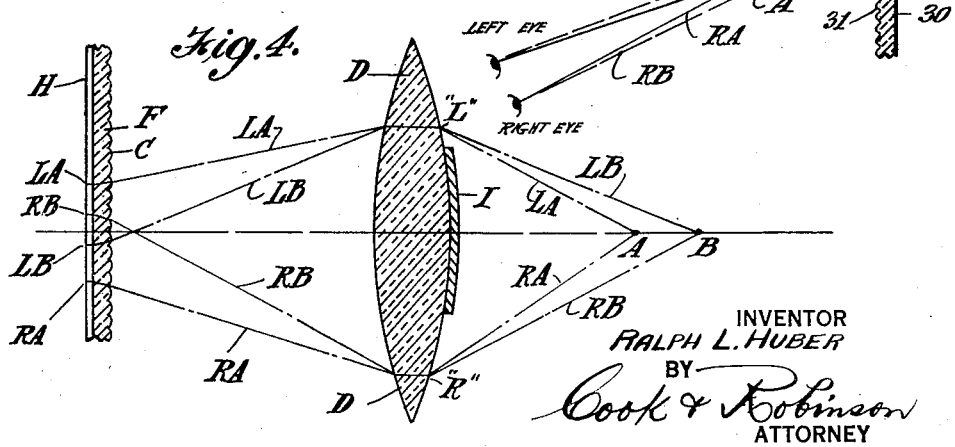
INVENTOR
RALPH L. HUBER
BY
Cook & Robinson
ATTORNEY Patented Mar. 5, 1935

1,993,448

UNITED STATES PATENT OFFICE 1,993,448

SYSTEM IN STEREOSCOPIC PHOTOGRAPHY

Ralph L. Huber, Seattle, Wash.

Application March 29, 1930, Serial No. 439,872

3 Claims. (Cl. 88—16.6)

This invention relates to a system of stereoscopic photography and it has for its object to provide a practical and satisfactory system for the taking and showing of true stereoscopic moving pictures.

It is also an object to provide a system, or method by which true stereoscopic results are obtained and are made visible to persons viewing the projected images, without it being required that the complemental views be photographed with special mirrors or prisms or that they be viewed through any special apparatus by the spectator.

The present invention involves, in the photographing of the images, the use of a single film substantially of that type used in the process disclosed by United States Patent No. 992,151 issued to Berthon on May 16, 1911; which film consists of a support with microscopic lenses on one surface and a sensitive emulsion on the other surface. It also involves, in the projecting or showing of the images, the use of a projection screen of a highly reflective, highly diffusive, non-irregular refractive character and closely covered with very microscopic, convex mirrors or concave mirrors or both convex and concave mirrors.

The process requires, in the camera, a set of objectives which provide for the taking of two binocular views simultaneous from points spaced apart, approximating the spacing of the human eyes or their parallax, and for recording the ray direction angles of these right and left ray mates of the views on the sensitized film; and it requires in the projector, a similar set of objectives, whereby the views taken by the respective objectives of the camera, may be projected in proper ray angle directions onto the screen, which, by virtue of its specialized construction, reflects the images coming thereto from different angles respectively to the different eyes of the observer; thereby giving the true binocular demands of the eyes and therefore true stereoscopic results.

Other objects of the invention reside in the various details of construction and in the combination and relationship of parts employed in the camera, film and the projector.

In accomplishing these and other objects of the invention, I have provided the improved details of construction, the preferred forms of which are illustrated in the accompanying drawing, wherein—

Fig. 1 is a diagram of the optical system and camera mechanism for taking stereoscopic views in accordance with the present invention.

Fig. 2 is a diagram of a system complementary to that of Fig. 1 for projecting images made by the first system.

Fig. 3 is an enlarged view of a portion of the projection screen showing the different angular reflections of rays from the spaced objective sets of the projector.

Fig. 4 is a detail explanatory to the method of taking the pictures.

In carrying out the present invention, it must be recognized that in order to obtain true stereoscopic results, it is necessary to take simultaneously on the recording film, two views by objective sets that are spaced apart as are the human eyes, or the proper distance so that when projected will arrive at spectator at proper angles, and that the images thus taken must be projected from the developed film onto the viewing screen in such manner that those taken by the two objectives will be individually apparent to the corresponding eyes of the observer.

Heretofore, a system has been employed whereby complementary stereoscopic images were taken on two separate films and, for projection, these were differently colored and when cast on the projection screen each were viewed through spectacles having the left lens colored in accordance with the film at that side of the camera and the right lens colored in accordance with the other film so that the complemental pictures were individually visible to the two eyes.

Other means have been devised to produce stereoscopic pictures for theatre showing, but all have, to a certain extent, proven to be unsatisfactory because of the requirement for special viewing apparatus for each observer and the impossibility of satisfactorily superimposing two views.

In carrying out the present invention, these difficulties and requirements are eliminated and I employ but a single film, and only require that the picture be viewed in the ordinary manner. In fact, there is no change in the manner of showing or viewing the pictures from the present day methods employed in moving picture theatres, but the stereoscopic result is the result of novel features in the camera in which the pictures are taken; in the projector, and in the projection screen on which they are cast for viewing.

Referring more in detail to the several views of the drawing—

In Fig. 1, 10 designates, in its entirety, a camera for taking the pictures in the present stereoscopic process. The camera is equipped with complemental sets of objectives 11—11 spaced apart horizontally in accordance with spacing of the human eyes, or whatever spacing is most desirable for various conditions, so that the views simultaneously recorded by the different sets of objectives will be taken from different angles. However, the two sets of objectives have a common axial line, as the line A—A in Fig. 1.

While I have shown the two objective sets as being entirely separate from each other, it is quite apparent that one set of relatively large lenses could be employed, and the central portion blocked out to a suitable extent for the purpose desired. It is not absolutely necessary, however, that this central part be blocked out and, in some instances, it might be left uncovered.

Back of the objective sets is a guide, or gate 12 in which is carried the film strip on which the views are recorded.

The film used is in the usual strip form and, for taking motion pictures, is intermittently advanced by the commonly used general gear mechanism, or any other suitable means, in synchronism with the opening and closing of the shutter mechanism employed for taking the exposures; these mechanisms not being herein illustrated as they form no material part of the invention. The special characteristics of the film itself are that it consists of a support F having on its front surface a series of minute lenses C regular or irregular, and on its rear surface a photographic layer H, as disclosed in Figure 4.

The relative arrangement of the objectives 11—11 and film strip is such that the images projected by the objectives will be formed on the photographic layer back of each individual lens concentric with such lens.

In Fig. 4 I have shown a diagram of right and left sample light rays from a near object upon the right, and left sample light rays from a far object. Point "A" being the near object and point "B" being the far object. These sample rays are transmitted in due order through lens "D" at point "L" for the left eye and point "R" for the right eye. Point "I" is the optional interocular blockout. The film "F" has its light sensitive emulsion "H" on the back, with its optically embossed front as at "C". The respective right and left rays respectively from point A and B will lie inversely by regularity after passing through the lens. That is, the rays from B will be located nearer together in the film as compared to the rays from A, thus registering a relative position in third dimensional space. Also the angle of entrance of the ray into the curvature of the embossing of the film will locate the ray in the emulsion in a position so that when reprojected will cause it to cross its mate from the other side in a definite relative position before entering the projector lens 20 in Fig. 3 as T for the far object B, and U for the near object A. Thus causing the pairs to emit from the projector lens 20 in Fig. 3 in a relative nearer parallel position. The near object rays are more nearly parallel than the far, thus causing the eyes to change their parallax when receiving the rays from their respective points of binocular intersection enroute from the screen, as the less parallel rays will cross earlier than the more parallel, therefore the parallax for the near object will be located at object A and for the far object, will be located at object B' which is as far back of the screen plane as point B is in front of the screen. The outward projection of the mind's picture is extended only in a straight line.

As stated previously in this description, the views must only be seen by the intended eye. These slightly dissimilar binocular views hidden from the opposite eye in projection actually exist in this method as you will see by again referring to Fig. 3. The left eye is looking at point A and does not see the rays that are not directed toward it as the rays intended for the right eye are only directed toward the right eye, therefore do not enter the left eye. This records the angle of reception of a definite light path.

In Fig. 2 is illustrated a projection system complemental to that of Fig. 1. It comprises a pair of objectives 20—20, spaced in accordance with the spacing of the objectives in the camera and of required focal lengths. Mounted rearwardly of the objectives is a film guide 21 within which the film F, which is a development of or a print from the original film and which corresponds in its construction. When illuminated from the rear, such as by means of the source of light 25 and reflector 26 and whatever lenses are necessary to properly apply the light rays, the images in the film back of any particular minute lens, being centered on the optical axis of such lens will be projected into its corresponding objective by the little lens so that the projected rays from the objectives fall upon the screen from different angles.

The screen on which the views are projected must necessarily be of a form of construction whereby the rays from the different objectives will be reflected separately to the two eyes of a person viewing the picture. For this reason, I employ a screen having its surface covered with minute spherical reflecting surfaces. In this construction, each minute spherical surface presents a highly diffusing reflecting surface, and the multiplicity of such surfaces reflects views projected from the two objective sets of the projecting means at different angles, and by reason of this divergence, a stereoscopic result will be apparent in the viewing.

The course of the sample rays of light from the projector to the screen and from the screen to the eyes of an observer, is illustrated in the diagram of Fig. 3, wherein, the projection screen is designated by reference numeral 30, and 31 designates in greatly enlarged scale the concave or convex reflecting surfaces provided by the individual spherical irregularities on the screen. A sample ray of light LA from the objective of the projector is reflected to the left eye of the individual viewing the scene along the line LA. Likewise, a ray RA from the objective of the projector is reflected along the line RA; the angular divergence of these rays being due to the convergence of the rays to the same point of focus and binocular intersection.

The convergence or parallax of the two eyes will intersect at point A in Fig. 3 therefore locating the object being viewed in stereoscopy closer to observer than the screen as point A. Other locations of the integrants will be in proportion to the ray angle directions that cause the intersection of the right and left rays forming the parallax of that point to the eye. The nearer the point of intersection to the screen the smaller the angle of the parallax to that particular sample pair of eyes, and consequently causing less convergence which imparts a sensation of greater distance. Rays of light delivered onto the screen from the two objectives are likewise reflected by all of the minute reflecting surfaces 31 and each observer regardless of position (within reasonable range) obtains the stereoscopic result. For explanation, it will be stated that the smallness of the concave or convex reflecting spherical irregularities of the screen offers a clearer and brighter picture.

Considering the camera, projector film and screen to be constructed and arranged as described, briefly the operation would be as follows: For taking a picture the camera would be brought into proper position and focused on the view to be recorded. If it is an object such as that designated at K in Figure 1, it is quite readily apparent that the two objectives will project different views on the film F, and the microscopic lenses on the film surface will cause these to be recorded on the sensitive layer H in Fig. 4. When this film is developed and positive prints made from it, and the film passed through the projector, it is quite apparent that the light ray angles of the two views recorded by the camera will be projected at respective angles onto the projection screen and will be reflected to the eyes of the observers. The feature of the screen resides in the minute spherical reflecting surfaces whereby the individual rays of light from the two objectives of the projector are reflected at such angular convergence that they will be individually visible to the proper eye of each observer. This will be the case no matter from what position the screen is viewed.

It is to be understood that the objectives of both the camera and the projector could be spaced apart to a more or less extent according to the requirements for obtaining the most satisfactory results.

It is quite apparent also that the details of construction and arrangement of parts might be varied to some extent without departing from the spirit of the invention, and for this reason it is not desired that the claims limit the scope of the invention only to what has been illustrated and described, but that they broadly cover the method in full measure commensurate with the scope of the invention disclosed.

Having thus described my invention, what I claim as new therein and desire to secure by Letters-Patent is:

1. A system of stereoscopic photography comprising a camera with spaced apart objectives for the simultaneous photographing of the directions of the individual rays of two complemental stereoscopic views, a photographic medium having a lenticular surface for recording the individual ray angle directions of these complemental views, a projector for accommodating the photographic medium having spaced objectives whereby the complemental views as recorded by the photographic medium will be projected onto a screen for viewing, and a screen for receiving the projected views in coincidence simultaneously and having an irregular, totally reflecting, and highly diffusive surface whereby the rays received at any point from the two objectives of the projector will be reflected in angular divergence to the corresponding eyes of the observer at any point within the viewing scope of the screen.

2. A system for use in stereoscopic photography comprising a camera with horizontally spaced objective sets of a common axis for the photographing of ray angle directions of individual rays of complemental stereoscopic views, a photographic medium associated with the camera on which these complemental views, having ray angle directions of the details, may be separately recorded with a record of these respective ray angle directions, a projector for accommodating the photographic medium or its counterpart having horizontally spaced objective lenses of a common axis, whereby the complemental views taken by the camera may be projected for viewing, and a projection screen having its surface covered with mirrored minute reflecting surfaces whereby light rays from the respective views directed thereonto by the objectives of the projector will be reflected in angular divergence to the corresponding eyes of the observer.

3. A system for use in stereoscopic photography comprising a camera with horizontally spaced objectives of a common axis for the photographing of views from different angles, a photographic member associated with the camera comprising a support having a photographic layer on one surface and numerous microscopic image forming elements on the other whereby the ray angle directions of the complemental views received by the respective objectives are separately recorded by the photographic member, or its counterpart, and having projecting objective sets of common axis, and spaced in accordance with the objectives of the camera and a projection screen onto which the views may be projected for viewing, comprising a reflecting surface formed by closely placed microscopically curved reflecting surfaces whereby rays from the two projectors are caused to be separately reflected to the corresponding eyes of the observer.

RALPH L. HUBER.